United States Patent [19]

Williams et al.

[11] Patent Number: 5,299,304
[45] Date of Patent: Mar. 29, 1994

[54] METHOD AND APPARATUS FOR IDENTIFYING MULTIPLE STAGE DOCUMENT FORMAT TRANSFORMATIONS

[75] Inventors: Marvin L. Williams, Lewisville, Tex.; Roselyn H. Yun, Honolulu, Hi.

[73] Assignee: International Business Machines Corporation, Armonk, N.Y.

[21] Appl. No.: 685,810

[22] Filed: Apr. 16, 1991

[51] Int. Cl.⁵ .............................................. G06F 15/62
[52] U.S. Cl. ....................................... 395/148; 395/145
[58] Field of Search .............................. 395/145, 148; 364/419.16, 419.02, 419.01, 226.1, 226.4, 943.5

[56] References Cited

U.S. PATENT DOCUMENTS 4,751,740 6/1988 Wright ...................................... 382/1

Primary Examiner—Gary V. Harkcom
Assistant Examiner—Joseph Feild
Attorney, Agent, or Firm—Andrew J. Dillon

[57] ABSTRACT

Modern electronic office environments often include hundreds of different document format types. Format/object transformation applications exist which are capable of transforming a first selected document/object format into a second selected document/object format; however, the existence of thousands of such transformation applications make it difficult to identify the existence of multiple stage format transformations. Accordingly, a matrix is established having multiple rows and columns of zero value cells. An identification of selected document/object formats is associated with each row and column of the matrix. Thereafter, for each existing transformation capable of directly converting a selected document/object format into a second selected document/object format a value of one is entered into a cell at the intersection of a row of the matrix associated with the selected document/object format and a column of the matrix associated with the second selected document/object format. The existence of a multiple stage transformation from a first particular document/object format into a second particular document/object format is then determined by evaluating the matrix at successive powers from one to N for a nonzero value R in a cell at the intersection of the two document/object identifiers.

6 Claims, 3 Drawing Sheets

Matrix I²

| IN \ OUT | IA5 | ASCII | RFT | FFT | SGML | ODA | G3FAX | |
|---|---|---|---|---|---|---|---|---|
| IA5 | 0 | 0 | 1 | 1 | 2 | 1 | 0 | ~32 |
| ASCII | 0 | 0 | 1 | 0 | 1 | 1 | 1 | ~32 |
| RFT | 0 | 0 | 0 | 0 | 0 | 0 | 0 | ~32 |
| FFT | 0 | 0 | 1 | 0 | 1 | 0 | 2 | ~32 |
| SGML | 0 | 0 | 0 | 0 | 0 | 0 | 1 | ~32 |
| ODA | 0 | 0 | 1 | 0 | 0 | 0 | 1 | ~32 |
| G3FAX | 0 | 0 | 0 | 0 | 0 | 0 | 0 | ~32 |

Fig. 3

Matrix I³

| IN \ OUT | IA5 | ASCII | RFT | FFT | SGML | ODA | G3FAX | |
|---|---|---|---|---|---|---|---|---|
| IA5 | 0 | 0 | 3 | 0 | 2 | 1 | 3 | ~32 |
| ASCII | 0 | 0 | 1 | 0 | 1 | 0 | 2 | ~32 |
| RFT | 0 | 0 | 0 | 0 | 0 | 0 | 0 | ~32 |
| FFT | 0 | 0 | 1 | 0 | 0 | 0 | 2 | ~32 |
| SGML | 0 | 0 | 0 | 0 | 0 | 0 | 0 | ~32 |
| ODA | 0 | 0 | 0 | 0 | 0 | 0 | 1 | ~32 |
| G3FAX | 0 | 0 | 0 | 0 | 0 | 0 | 0 | ~32 |

Fig. 4

METHOD AND APPARATUS FOR IDENTIFYING MULTIPLE STAGE DOCUMENT FORMAT TRANSFORMATIONS

BACKGROUND OF THE INVENTION

1. Field of the Invention

The present invention relates in general to the field of object type transformations and in particular to the field of multiple stage document format transformations. Still more particularly the present invention relates to a method and apparatus for identifying the existence of multiple stage object type transformations and identifying the number of stages in each such transformation.

2. Description of the Prior Art

In the modern electronic office environment documents or other objects may exist in many different format or types. For example, it is common for a document to exist in any one of multiple word processing formats, image formats, graphic formats, facsimile formats, binary formats or other user-defined formats. In a multivendor network environment documents may be sent from one user to another user wherein each user may utilize different document editors to work with the document. In situations in which each user desires to edit the document within a different format it is therefore necessary to provide document transformation applications which may be utilized to convert the document from an original document type to a second document type which is manipulatable by the receiver.

Those situations in which a document type may be simply and efficiently transformed from a first document format to a second document format utilizing an existing transformation application are simple and efficient to utilize. However, the increasing complexity and number of document formats which are available in the modern electronic office environment make it necessary to utilize hundreds of different document transformation applications in order to be able to convert a document to a desired format or type.

Additionally, it is often necessary for a document to be transformed into an intermediate stage prior to ultimate conversion to the desired document type due to the lack of a direct transformation application capable of transforming the original document to the desired document format.

While many different document transformation applications exist there is no expedient and efficient method to determine the existence or nonexistence of a multiple stage format transformation. In modern electronic systems which are capable of performing hundreds of multiple transformations it should be obvious that a need exists for a technique to determine whether or not a multiple stage format transformation is possible to avoid the expenditure of enormous amounts of processor assets.

SUMMARY OF THE INVENTION

It is therefore one object of the present invention to provide an improved method to determine the existence of document/object format transformations.

It is another object of the present invention to provide an improved method to determine the existence of multiple stage document/object format transformation.

It is yet another object of the present invention to provide a method and apparatus for identifying the existence of multiple stage document/object format transformations and identifying the number of stages in each such transformation.

The foregoing objects are achieved as is now described. Format/object transformation applications exist which are capable of transforming a first selected document/object format into a second selected document/object format; however, the existence of thousands of such transformation applications make it difficult to identify the existence of multiple stage format transformations. In accordance with the method and apparatus of the present invention, a matrix is established having multiple rows and columns of zero value cells. An identification of selected document/object formats is associated with each row and column of the matrix. Thereafter, for each existing transformation capable of directly converting a selected document/object format into a second selected document/object format a value of one is entered into a cell at the intersection of a row of the matrix associated with the selected document/object format and a column of the matrix associated with the second selected document/object format. The existence of a multiple stage transformation from a first particular document/object format into a second particular document/object format is then determined by evaluating the matrix at successive powers from one to N for a nonzero value R in a cell at the intersection of a row of the matrix associated with the first particular document/object format and a column of the matrix associated with the second particular document/object format.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a pictorial representation of the matrix of FIG. 2 raised to the second power;

FIG. 4 is a pictorial representation of the matrix of FIG. 2 raised to the third power.

DETAILED DESCRIPTION OF THE INVENTION

Figures 1, 2:
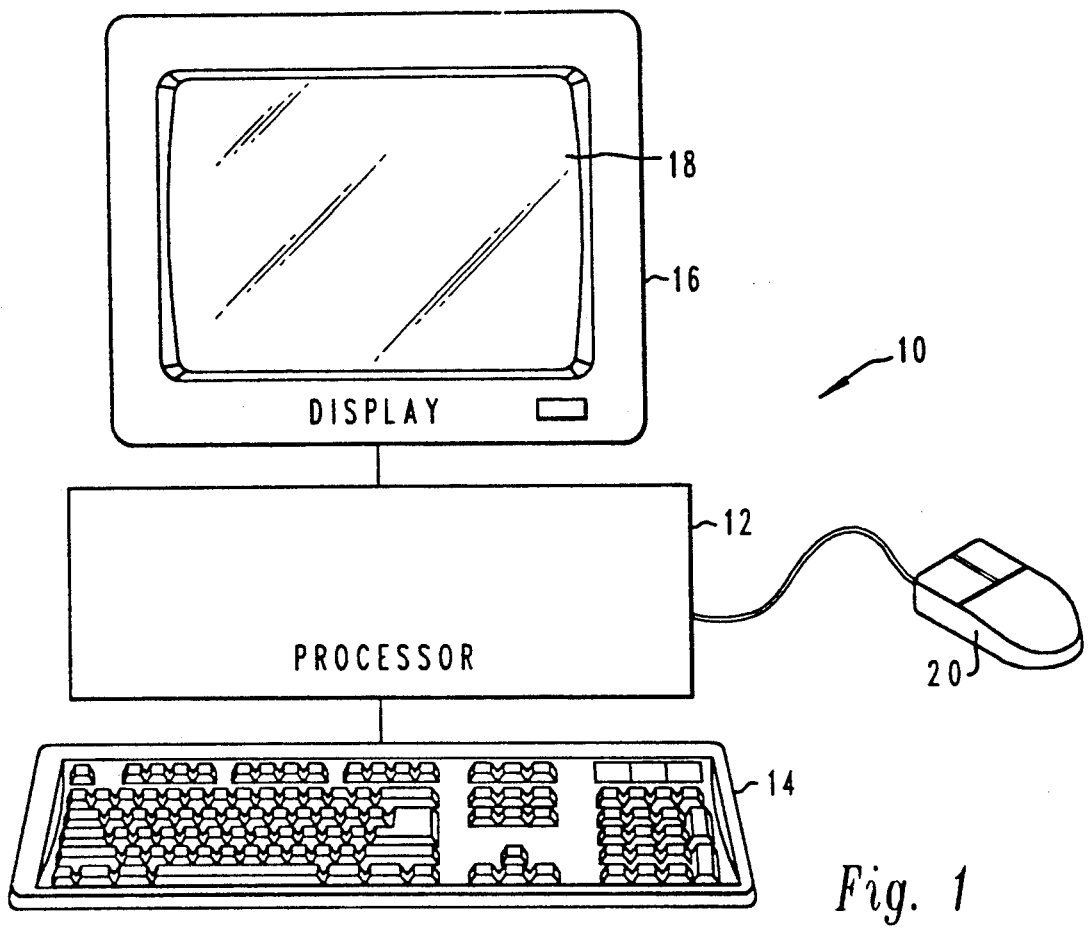
FIG. 1 is a pictorial representation of a data processing system which may be utilized to implement the method and apparatus of the present invention.
FIG. 2 is a pictorial representation of a matrix which may be utilized to implement the method and apparatus of the present invention.

With reference now to the figures and in particular with reference to FIG. 1, there is depicted a pictorial representation of a data processing system 10 which may be utilized to implement the method and apparatus of the present invention. As is illustrated, data processing system 10 includes a processor 12 which is coupled to keyboard 14 and display device 16 in a manner well known in the art. Display device 16 includes a display screen 18. Those skilled in the art will appreciate that data processing system 10 may be implemented by utilizing any suitable computer including the so-called "personal computer" or a workstation coupled to a mainframe host computer. One example of a data processing system which may be utilized to implement the method and apparatus of the present invention is the International Business Machines Corporation personal computer PS/2.

As those skilled in the art will appreciate data processing system 10 may be utilized to process documents or other objects which are coupled to data processing system 10 via a distributed data processing network or loaded into data processing system 10 utilizing magnetic storage media and direct access storage devices such as disk drives, which are normally provided within processor 12. Documents or other objects loaded within data processing system 10 may exist in a wide variety of types and may be formatted in a wide variety of document formats. For example, many different word processing formats exist, each including format characteristics which are specific to the format selected by the manufacturer of that data processing system.

Additionally, international standards such as ASCII and International ASCII (IA5) also exist and are commonly utilized to transfer documents between data processing systems. Alternately, various levels of word processing format may exist within a single word processing format, such as the Revisable Format Text Format (RFT) and Final Format Text (FFT) formats. Similarly, a facsimile format or graphic markup language, such as SGML, also exist. There are, in a modern state-of-the-art computer system, literally thousands of formats which may be utilized to characterize the manner in which data is stored within a document or object. The conversion of one document or object format to another document or object format is also well known in the art. For purposes of explanation herein the term "document" shall be utilized to mean any collection of data identifiable as a data object within a data processing system and the term "format" shall be used to signify either a format or type associated with such a data object.

While many format conversion applications exist in the prior art each of these conversions is generally capable of converting from a stated source document format into a defined target document format. However, it should be apparent that by sequentially utilizing many different transformation applications it is possible to convert one document format into a second document format via multiple stages of intermediate formats. It is an object of the present invention to provide a method and apparatus whereby the existence of such multiple stage format transformations may be efficiently determined and utilized.

Referring now to FIG. 2 there is depicted a pictorial representation of a matrix I which may be utilized to implement the method and apparatus of the present invention. As may be seen, matrix I, as indicated at reference 30, comprises a plurality of rows 32 and columns 36. In accordance With an important feature of the present invention each row 32 has associated with it an identification of a selected document format. Additionally, each column 36 has associated with it a similar identification of a selected document format.

Matrix I, as indicated at reference 30, is initially created including a plurality of cells representing the intersection of each row 32 with each column 36. Initially, each such cell is set to a zero value; however, in order to practice the method and apparatus of the present invention, each cell representing the intersection of a first document format which may be converted into a second document format utilizing an existing transformation is increased in value by placing a numeral 1 within that cell. Thus, as indicated at reference 34, final format text (FFT) may be converted into revisable format text (RFT) as indicated by the presence of a numeral 1 in the cell representing the intersection of row 32 and column 36 for these two formats. Similarly, a numeral 1 is placed in each cell representing the intersection of an input format and an output format which may be directly accomplished utilizing an existing transformation application.

With reference now to FIG. 3 there is depicted a pictorial representation of the matrix of FIG. 2 raised to the second power. Those skilled in the art will appreciate that matrix multiplication is a simple and straightforward mathematical process. Again, matrix $I^2$, as indicated at reference numeral 30, still includes a plurality of rows 32 and columns 36; however, it should be noted that the raising of matrix I to the second power has changed the numerical values contained within the cells of the matrix. Thus, as indicated at reference numeral 38, a numeral 2 now exists in the cell representing a transformation from International ASCII (IA5) to Standardized Graphic Markup Language (SGML).

In accordance with the method and apparatus of the present invention a nonzero value within the cell representing the intersection between an input format and an output format indicates that a multiple stage transformation exists which may be utilized to transform the input format to the output format. The number within that cell, when matrix I is created in accordance with the present invention, indicates the number of transformation pathways which exist for that transformation. Thus, the numeral 2 within cell 38 indicates that two separate pathways exist for converting International ASCII (IA5) to Standardized Graphic Markup Language (SGML) through one intermediate stage.

Further, the method of the present invention provides an indication of the number of stages which are necessary for this conversion. The number of stages necessary is equal to the power to which the matrix has been raised. Thus, two pathways exist for the above-referenced conversion, both of which require two intermediate steps.

This may be determined by referring again to FIG. 2. As illustrated in FIG. 2, International ASCII (IA5) may be converted in a single step to Final Format Text (FFT) and Office Document Architecture (ODA). Thereafter, by simple iteration those skilled in the art, upon reference to FIG. 2, will appreciate that both Final Format Text (FFT) and Office Document Architecture (ODA) may be converted to Standardized Graphic Markup Language (SGML). While two stage transformation pathways may be straightforward and simple to determine utilizing these straightforward techniques, those skilled in the art should appreciate that the existence of hundreds of transformation applications for hundreds of different formats renders this process substantially more difficult.

With reference now to FIG. 4, there is depicted a pictorial representation of the matrix of FIG. 2 raised to the third power. As indicated at reference numeral 30, matrix $I^3$ continues to include a plurality of rows 32 and columns 36. While multiplying the matrix of FIG. 3 by the matrix of FIG. 2, the numbers within the individual cells will again vary. As indicated at reference numeral 40 there now exist three paths of conversion from International ASCII (IA5) to Revisable Format Text (RFT). Additionally, as set forth with regard to FIG. 3 the raising of matrix I to the third power indicates that each of these conversions requires three stages.

Those skilled in the art will appreciate, upon reference to the foregoing that by utilizing the method and apparatus of the present invention it is possible to efficiently and rapidly determine: 1) whether or not a transformation exists which can transform a first document format into a second document format; and 2) how many stages of conversion will be required for the aforementioned transformation. Thus, by iteratively evaluating matrix I at successive powers the minimal number of stages necessary for a transformation may be rapidly and efficiently determined. Further, the user may, utilizing a technique which will be set forth in greater detail herein, specify the maximum number of stages of transformation which he or she desires. Thus, an evaluation of matrix I at each successive power up to the maximum selected by the user will rapidly and efficiently determine whether or not a transformation exists within the parameters specified by the user. Those skilled in the art will appreciate that absent the method and apparatus of the present invention, substantial processor assets may be squandered attempting to find a transformation from a first document format to a second document format when such a transformation does not exist or the desired transformation requires a large number of intermediate steps.

Figure 5:
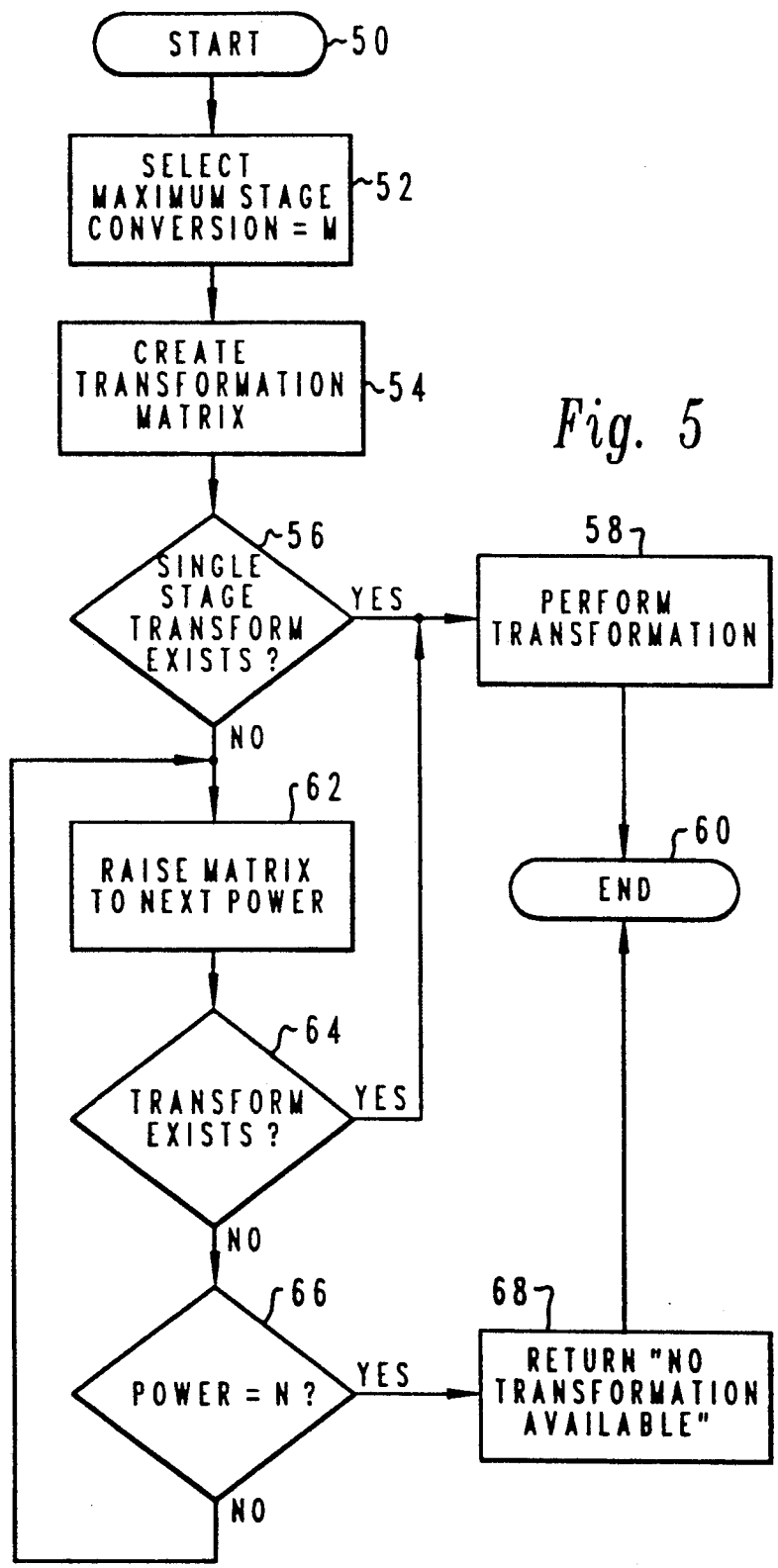
FIG. 5 is a logic flowchart illustrating the method and apparatus of the present invention.

Finally with reference to FIG. 5, there is depicted a logic flowchart illustrating the method and apparatus of the present invention. As illustrated, the process begins at block 50 thereafter passes to block 52 which depicts the selecting of the maximum number of stages desired by the user for a selected conversion from a first selected document format to a second selected document format. As illustrated, the user has selected a maximum number of stages equal to M.

Next, the process passes to block 54 which illustrates the creation of the basic transformation matrix illustrated in FIG. 2. That is, a matrix comprising a plurality of rows and columns, each row and column having associated therewith an identification of a document format. Thereafter, the zero cell values within the matrix are incremented by the number 1 for each transformation which exists for directly converting a document format identified in association with a particular row to the document format identified in association with a particular column within the cell representing the intersection of that row and that column.

Next, the process passes to block 56 which illustrates a determination of whether or not a single stage transformation exists. If so, the process merely passes to block 58 which depicts the performance of the transformation. Thereafter, the process passes to block 60 and terminates.

Referring again to block 56 in the event a single stage transformation does not exist, the process passes to block 62 which depicts the raising of the matrix to the next successive power. Thereafter, the process passes to block 64 which illustrates a determination of whether or not a transformation exists, as indicated by a nonzero value within the appropriate cell of the matrix. If so, the transformation is iteratively determined and the process passes to block 58 wherein the performance of that transformation is illustrated.

Referring again to block 64 in the event a transformation from the first document format to the second document format does not exist, as evidenced by a zero value within the appropriate cell of the matrix the process passes to block 66 wherein the power of the matrix is determined. If the matrix has not been raised to the maximum power selected by the user as the maximum number of stages within a conversion the process returns to block 62 to raise the matrix to the next power and the process thereafter continues. Referring again to block 66 in the event the power of the matrix equals the maximum number of stages selected by the user, the process passes to block 68 which illustrates the returning of a "no transformation available" message. Thereafter, the process passes to block 60 and terminates.

Upon reference to the foregoing, those skilled in the art will appreciate that the method and the apparatus of the present invention provide a rapid and efficient method whereby a user may accurately determine whether or not a multi-stage transformation exists from one document format to another document format. Additionally, the user may select the maximum number of stages desired for a selected conversion, thereby minimizing the amount of processor assets which might otherwise be utilized to attempt to locate a multi-stage conversion path.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method in a data processing system having a processor, memory and a keyboard for identifying the existence of a multiple stage transformation of a first document format into a second document format and implementing that transformation, said method comprising the data processing system implemented steps of:

storing within said memory within said data processing system a matrix having a plurality of rows and columns of zero value cells;

associating within said data processing system an identification of a selected document format with each of said plurality of rows and each of said plurality of columns;

for each existing transformation application within said data processing system for directly transforming a first selected document format into a second selected document format entering a value of one into a cell at the intersection of a row of said matrix associated with an identification of said first selected document format and a column of said matrix associated with an identification of said second selected document format utilizing said keyboard;

for a desired transformation from a first particular document format into a second particular document format evaluating said matrix at successive powers from one to N utilizing said processor for detecting a presence of a nonzero value R in a cell at the intersection of a row of said matrix associated with an identification of said first particular document format and a column of said matrix associated with an identification of said second particular document format;

displaying to a user an indication of the existence of R transformations for transforming said first particular document format into said second particular document format within N stages in response to said presence of said nonzero value R; and transforming said first particular document format into said second particular document format within said processing system utilizing at least one of said R transformations.

2. The method in a data processing system for identifying the existence of a multiple stage transformation of a first document format into a second document format according to claim 1, further including the step of iteratively identifying at least one of said R transformations for transforming said fist particular document format into said second particular document format within N stages in response to said presence of said nonzero value R.

3. The method in a data processing system for identifying the existence of a multiple stage transformation of a first document format into a second document format according to claim 1, further including the step of automatically terminating said evaluation of said matrix at a power of M in response to a failure to detect an absence of a nonzero value R in said cell at the intersection of a row of said matrix associated with an identification of said first particular document format and a column of said matrix associated with an identification of said second particular document format.

4. A data processing system for identifying the existence of a multiple stage transformation of a first document format into a second document format and implementing that transformation, said data processing system comprising:

memory;

a matrix stored within said memory having a plurality of rows and columns of zero value cells;

means for associating within said memory an identification of a selected document format with each of said plurality of rows and each of said plurality of columns;

data entry means for entering a value of one into a cell at the intersection of a row of said matrix associated with an identification of a first selected document format and a column of said matrix associated with an identification of a second selected document format for each existing transformation application within said data processing system for directly transforming said fist selected document format into said second selected document format;

processor means for evaluating said matrix at successive powers from one to N for detecting a presence of a nonzero value R in a cell at the intersection of a row of said matrix associated with an identification of a first particular document format and a column of said matrix associated with an identification of a second particular document format for a desired transformation from said first particular document format into said second particular document format;

means for displaying to a user an indication of the existence of R transformations for transforming said first particular document format into said second particular document format within N stages in response to a presence of said nonzero value R; and means for transforming said first particular document format into said second particular document format utilizing at least one of said R transformations.

5. The data processing system for identifying the existence of a multiple stage transformation of a first document format into a second document format according to claim 4, further including means for iteratively identifying at least one of said R transformations for transforming said first particular document format into said second particular document format within N stages in response to an existence of said nonzero value R.

6. The data processing system for identifying the existence of a multiple stage transformation of a first document format into a second document format according to claim 4, further including means for automatically terminating said evaluation of said matrix at a power of M in response to a failure to detect an absence of a nonzero value R in said cell at the intersection of a row of said matrix associated with an identification of said first particular document format and a column of said matrix associated with an identification of said second particular document format.

* * * * *